United States Patent
Yuhas et al.

(10) Patent No.: US 10,570,021 B2
(45) Date of Patent: *Feb. 25, 2020

(54) CRYSTALLINE METALLOPHOSPHATES, THEIR METHOD OF PREPARATION, AND USE

(71) Applicant: UOP LLC, Des Plaines, IL (US)

(72) Inventors: Benjamin D. Yuhas, Evanston, IL (US); Melissa M. Galey, Chicago, IL (US); Mark A. Miller, Niles, IL (US); John P. S. Mowat, Arlington Heights, IL (US); Wharton Sinkler, Des Plaines, IL (US); Gregory J. Lewis, Santa Cruz, CA (US); Lisa M. Knight, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/036,572

(22) Filed: Jul. 16, 2018

(65) Prior Publication Data

US 2019/0031520 A1 Jan. 31, 2019

Related U.S. Application Data

(60) Provisional application No. 62/538,357, filed on Jul. 28, 2017.

(51) Int. Cl.
| | | |
|---|---|---|
| C01B 39/54 | (2006.01) |
| B01J 29/83 | (2006.01) |
| B01D 53/02 | (2006.01) |
| B01J 29/84 | (2006.01) |
| B01D 53/26 | (2006.01) |
| B01J 20/18 | (2006.01) |
| B01J 20/30 | (2006.01) |
| B01J 29/85 | (2006.01) |
| B01J 37/00 | (2006.01) |
| B01J 37/04 | (2006.01) |
| B01J 37/10 | (2006.01) |
| B01J 39/02 | (2006.01) |
| B01J 39/14 | (2006.01) |

(52) U.S. Cl.
CPC ............. *C01B 39/54* (2013.01); *B01D 53/02* (2013.01); *B01D 53/261* (2013.01); *B01J 20/18* (2013.01); *B01J 20/3057* (2013.01); *B01J 20/3085* (2013.01); *B01J 29/83* (2013.01); *B01J 29/84* (2013.01); *B01J 29/85* (2013.01); *B01J 37/0018* (2013.01); *B01J 37/04* (2013.01); *B01J 37/10* (2013.01); *B01J 39/02* (2013.01); *B01J 39/14* (2013.01); *B01D 2253/104* (2013.01); *B01D 2253/106* (2013.01); *B01D 2253/108* (2013.01); *B01D 2256/245* (2013.01); *C01P 2002/72* (2013.01); *C01P 2002/74* (2013.01); *C01P 2002/77* (2013.01)

(58) Field of Classification Search
CPC ....... C01B 39/54; C01B 38/08; C01B 37/065; C01B 37/04; B01J 29/88; B01J 29/85; B01J 29/84; B01J 29/83
See application file for complete search history.

(56) References Cited

U.S. PATENT DOCUMENTS

| | | | |
|---|---|---|---|
| 4,310,440 A | 1/1982 | Wilson et al. |
| 4,440,871 A | 4/1984 | Lok et al. |
| 4,567,029 A | 1/1986 | Wilson et al. |
| 4,973,785 A | 11/1990 | Lok et al. |
| 5,126,308 A | 6/1992 | Barger et al. |
| 8,871,178 B2 * | 10/2014 | Lewis | C01B 39/54 423/277 |
| 8,936,776 B2 * | 1/2015 | Lewis | C01B 39/54 423/277 |
| 9,522,896 B2 | 12/2016 | Nicholas et al. |

FOREIGN PATENT DOCUMENTS

EP 2867166 B1 3/2017

OTHER PUBLICATIONS

Feng et al. (Hydrothermal syntheses and structural characterization of zeolite analogue compounds based on cobalt phosphate, Nature, 1997, vol. 388, pp. 735-740).*

Smith et al., Enumeration of 4-connected 3-dimensional nets and classification of framework silicates: the infinite set of ABC-6 nets; the Archimedian and σ-related nets; American Mineralogist, vol. 66, pp. 777-788, 1981.

Xie et al., "SSZ-52, a Zeolite with an 18-Layer Aluminosilicate Framework Structure RElated to That of the DeNOx Catalyst Cu-SSZ-13", Journal of the American Chemical Society, 2013, 135, 10519-10524, 2013.

Alberti et al., Phase transformations and structural modifications induced by heating in microporous materials, Studies in Surface Science and Catalysis 155, pp. 19-42, Elsevier B. V., 2005.

(Continued)

*Primary Examiner* — Jafar F Parsa

(57) ABSTRACT

A new family of crystalline microporous metallophosphates designated AlPO-77 has been synthesized. These metallophosphates are represented by the empirical formula $$H_x M_m^{2+} E P_x Si_y O_z$$

where M is a framework metal alkaline earth or transition metal of valence +2, and E is a trivalent framework element such as aluminum or gallium. The AlPO-77 compositions are characterized by a new unique ABC-6 net structure, and have catalytic properties suitable for carrying out various hydrocarbon conversion processes, as well as characteristics suitable for adsorption applications.

3 Claims, 3 Drawing Sheets

(56) References Cited

OTHER PUBLICATIONS

Wright et al., Cation-directed syntheses of novel zeolite-like metalloaluminophosphates STA-6 and STA-7 in the presence of azamacrocycle templates, J. Chem. Sc=oc., Dalton Trans., 2000, pp. 1243-1248.

Schreyeck et al., The diaza-polyoxa-macrocycle 'Kryptofix222' as a new template for the synth esis of LTA-type~AlPO4 Co-templating role of F and/or (CH3)4N+ ions, Micorporous and Mesoporous Materials 22 (1998) 87-106.

Keller et al., Synthesis, Structures of AlPO4-C and AlPO4-D, and Their Topotactic Transformation, Solid State Ionics 43 (1990) 93-102, Elsevier Science Publishers.

Arletti et al., "A new Framework topology in the dehydrated form of zeolite levyne", American Mineralogist, vol. 98, pp. 2063-2074, 2013.

Cruciani, "Zeolites upon heating: Factors governing their thermal stability and structural changes", Journal of Physics and Chemistry of Solids 67 (2006) 1973-1994.

Li et al., In silico prediction and screening of modular crystal structures via a high-throughput genomic approach; Nature Communications 6:8328 DOI: 10.1038/ncomms9328 (2015).

International Search Report for International application No. PCT/US2018/043627 dated Nov. 8, 2018.

\* cited by examiner

CRYSTALLINE METALLOPHOSPHATES, THEIR METHOD OF PREPARATION, AND USE

CROSS-REFERENCE TO RELATED APPLICATION

This application claims priority from Provisional Application No. 62/538,357 filed Jul. 28, 2017, the contents of which cited application are hereby incorporated by reference in its entirety.

BACKGROUND OF THE INVENTION

This invention relates to a novel family of metallophosphates, collectively designated AlPO-77. They are represented by the empirical formula:

$$H_w M_m^{2+} E P_x Si_y O_z$$

where M is a divalent framework metal such as magnesium or zinc, and E is a trivalent framework element such as aluminum or gallium.

Classes of molecular sieves include crystalline aluminophosphate, silicoaluminophosphate, or metalloaluminophosphate compositions which are microporous and which are formed from corner sharing $AlO_{4/2}$ and $PO_{4/2}$ tetrahedra. In 1982, Wilson et al. first reported aluminophosphate molecular sieves, the so-called AlPOs, which are microporous materials that have many of the same properties as zeolites, although they do not contain silica (See U.S. Pat. No. 4,310,440). Subsequently, charge was introduced to the neutral aluminophosphate frameworks via the substitution of $SiO_{4/2}$ tetrahedra for $PO_{4/2}^+$ tetrahedra to produce the SAPO molecular sieves as described by Lok et al. (See U.S. Pat. No. 4,440,871). Another way to introduce framework charge to neutral aluminophosphates is to substitute $[Me^{2+}O_{4/2}]^{2-}$ tetrahedra for $AlO_{4/2}^-$ tetrahedra, which yields the MeAPO molecular sieves (see U.S. Pat. No. 4,567,029). It is furthermore possible to introduce framework charge on AlPO-based molecular sieves via the simultaneous introduction of $SiO_{4/2}$ and $[M^{2+}O_{4/2}]^{2-}$ tetrahedra to the framework, giving MeAPSO molecular sieves (See U.S. Pat. No. 4,973,785).

Numerous molecular sieves, both naturally occurring and synthetically prepared, are used in various industrial processes. Synthetically, these molecular sieves are prepared via hydrothermal synthesis employing suitable sources of Si, Al, P, and structure directing agents such as amines or organoammonium cations. The structure directing agents reside in the pores of the molecular sieve and are largely responsible for the particular structure that is ultimately formed. These species may balance the framework charge associated with silicon or other metals such as Zn or Mg in the aluminophosphate compositions, and can also serve as space fillers to stabilize the tetrahedral framework. Molecular sieves are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent molecular sieve crystal structure. Molecular sieves can be used as catalysts for hydrocarbon conversion reactions, which can take place on outside surfaces as well as on internal surfaces within the pore.

As stated above, molecular sieves are capable of reversibly adsorbing and desorbing certain molecules depending on the adsorbate's size and the molecular sieve's internal pore structure. There are instances where it may be desirable to alter the pore structure of a given molecular sieve in order to more efficiently adsorb a certain molecule, or to more efficiently exclude a competing molecule in a given process stream. For example, the dehydration of natural gas streams requires an adsorbent to remove water vapor while excluding larger molecules such as methane, hydrogen sulfide, or carbon dioxide. One method of altering the pore structure of a molecular sieve is through ion-exchange. This is well-known in the art, and commonly applied to aluminosilicates (i.e., zeolites). By exchanging a smaller alkali metal cation with a larger alkali metal cation, the effective pore size can be reduced, and larger molecules that would compete with water for adsorption in the zeolite pores can be excluded (see, for example, U.S. Pat. Nos. 3,024,867, 4,663,052).

Another way that the adsorptive properties of a molecular sieve can be altered is through the degree of hydration of the molecular sieve. According to Bish and Carey, there is a class of zeolites that undergo topological changes in their framework connectivity upon dehydration (Bish, D. L., and Carey, J. W. (2001) "Thermal behavior of natural zeolites" In D. L. Bish and D. W. Ming, Eds., NATURAL ZEOLITES: OCCURRENCE, PROPERTIES, APPLICATIONS, vol. 45, p. 403-452. Reviews in Mineralogy and Geochemistry, Mineralogical Society of America). This topological change may be reversible or irreversible. Similar observations have been made in other aluminosilicates by Alberti and Martucci (STUD. SURF. SCI. CATAL. 155, 19-43 (2005)), as well as by Cruciani. (J. PHYS. CHEM. SOL. 67, 1973-1994 (2006). It is also known in the art that certain aluminophosphate materials can undergo topological changes upon dehydration. For example, it was observed by Keller et al. that the material AlPO-C (APC structure) has been observed to transform into both AlPO-D (APD structure) as well as AlPO-H3, depending upon the conditions of dehydration. (Keller, E. B., et al. SOLID STATE IONICS 43, 93 (1990).

SUMMARY OF THE INVENTION

As stated, the present invention relates to a new family of metallophosphate molecular sieves collectively designated AlPO-77. One embodiment of the invention is a microporous crystalline material having a three-dimensional framework of at least $EO_{4/2}^-$ and $PO_{4/2}^+$ tetrahedral units, and furthermore, at least one of $[M^{2+}O_{4/2}]^{2-}$ and $SiO_{4/2}$ tetrahedral units and an empirical composition in the calcined form and anhydrous basis expressed by an empirical formula of:

$$H_x M_m^{2+} E P_x Si_y O_z$$

where H is a proton, "w" is the mole ratio of H to E and varies from 0 to 2.5, M is at least one metal cation of valence +2 selected from the group consisting of $Be^{2+}$, $Mg^{2+}$, $Zn^{2+}$, $Co^{2+}$, $Mn^{2+}$, $Fe^{2-}$, $Ni^{2+}$, "m" is the mole ratio of M to E and varies from 0 to about 1.0, E is a trivalent element selected from the group consisting of aluminum, gallium, iron, boron and mixtures thereof, "x" is mole ratio of P to E and varies from 0.5 to about 2.0, "y" is the mole ratio of Si to E and varies from 0 to about 2.0 and "z" is the mole ratio of O to E and has a value determined by the equation:

$$z=(w+2 \cdot m+3+5 \cdot x+4 \cdot y)/2$$

The invention is characterized in that it has the x-ray diffraction pattern having at least the d-spacings and intensities set forth in Table 1:

TABLE 1

| 2-Theta | d(Å) | Intensity |
|---|---|---|
| 8.73-9.35 | 10.12-9.48 | w-m |
| 11.06-11.55 | 7.99-7.65 | m-s |
| 13.60-13.84 | 6.50-6.39 | m-vs |
| 14.11-14.71 | 6.27-6.01 | w-s |
| 17.41-17.93 | 5.09-4.94 | s |
| 20.89-21.57 | 4.25-4.11 | m-s |
| 22.27-22.67 | 3.99-3.92 | s |
| 24.55-24.82 | 3.62-3.58 | w-m |
| 25.22-25.53 | 3.53-3.48 | w-m |
| 26.63-27.40 | 3.34-3.25 | w-m |
| 28.45-28.83 | 3.13-3.09 | s |
| 29.02-29.61 | 3.07-3.01 | m-s |
| 32.65-32.80 | 2.74-2.73 | w |
| 33.02-33.18 | 2.71-2.70 | w-m |
| 34.91-35.34 | 2.57-2.54 | m |

Another embodiment of the invention is a microporous crystalline material that can serve as a solid precursor to AlPO-77. This material has a three-dimensional framework of at least $EO_{4/2}^-$ and $PO_{4/2}^+$ tetrahedral units and optionally, at least one of $[M^{2+}O_{4/2}]^{2-}$ and $SiO_{4/2}$ tetrahedral units and an empirical composition in the as-synthesized form and anhydrous basis expressed by an empirical formula of:

$$R^+_r M^{2+}_m EP_x Si_y O_z$$

where M is at least one metal cation of valence +2 selected from the group consisting of $Be^{2+}$, $Mg^{2+}$, $Zn^{2+}$, $Co^{2+}$, $Mn^{2+}$, $Fe^{2+}$, $Ni^{2+}$, "m" is the mole ratio of M to E and varies from 0 to about 1.0, and R is an organoammonium cation. "r" is the mole ratio of R to E and has a value of about 0.1 to about 2.5, E is a trivalent element selected from the group consisting of aluminum, gallium, iron, boron and mixtures thereof, "x" is mole ratio of P to E and varies from 0.5 to about 2.0, "y" is the mole ratio of Si to E and varies from 0 to about 2.0, and "z" is the mole ratio of O to E and has a value determined by the equation:

$$z=(2 \cdot m+r+3+5 \cdot x+4 \cdot y)/2$$

The as-synthesized precursor material is characterized in that it has the x-ray diffraction pattern having at least the d-spacings and intensities set forth in Table 2:

TABLE 2

| 2-Theta | d(Å) | Intensity |
|---|---|---|
| 8.55-8.87 | 10.33-9.96 | w |
| 10.76-10.89 | 8.21-8.11 | s-vs |
| 11.16-11.35 | 7.92-7.79 | w-m |
| 13.44-13.58 | 6.58-6.51 | m |
| 15.97-16.13 | 5.54-5.49 | w |
| 16.85-17.11 | 5.26-5.18 | m-s |
| 17.26-17.43 | 5.13-5.08 | vs |
| 17.54-17.72 | 5.05-5.00 | m-s |
| 20.28-20.50 | 4.37-4.32 | s |
| 20.96-21.10 | 4.23-4.21 | m |
| 21.63-21.82 | 4.10-4.07 | s |
| 21.95-22.13 | 4.04-4.01 | vs |
| 22.55-22.80 | 3.94-3.90 | m |
| 23.41-23.59 | 3.80-3.77 | m-s |
| 24.44-24.66 | 3.64-3.61 | m |
| 25.56-25.78 | 3.48-3.45 | vw-w |
| 27.10-27.35 | 3.29-3.27 | m-s |
| 27.47-27.79 | 3.24-3.21 | s-vs |
| 28.00-28.28 | 3.18-3.15 | m-s |
| 29.22-29.45 | 3.05-3.03 | w |

TABLE 2-continued

| 2-Theta | d(Å) | Intensity |
|---|---|---|
| 30.72-31.00 | 2.91-2.88 | m |
| 32.27-32.57 | 2.77-2.75 | m-s |
| 33.68-34.04 | 2.66-2.63 | m-s |
| 34.11-34.37 | 2.63-2.61 | m-s |
| 36.79-37.13 | 2.44-2.42 | vw-w |

Another embodiment of the invention is a process for preparing the crystalline microporous metallophosphate molecular sieve described above. The process comprises forming a reaction mixture containing reactive sources of R, E, P, one or both of M and Si, and heating the reaction mixture at a temperature of about 60° C. to about 200° C. for a time sufficient to form the molecular sieve, the reaction mixture having a composition expressed in terms of mole ratios of the oxides of:

$$aR_2O:bMO:E_2O_3:cP_2O_5:dSiO_2:eH_2O$$

where "a" has a value of about 0.75 to about 12, "b" has a value of about 0 to about 2, "c" has a value of about 0.5 to about 8, "d" has a value of about 0 to about 4, and "e" has a value from 30 to 1000. The as-synthesized material is then calcined to remove the occluded organic template, allowed to re-hydrate, and then controllably dehydrated to yield the AlPO-77 material.

Yet another embodiment of the invention is an adsorption process using the crystalline AlPO-77 material. The process may involve the adsorption and desorption of organic and/or inorganic species, such as water, hydrocarbons, ammonia, methanol, or carbon dioxide. Separation of molecular species can be based either on the molecular size (kinetic diameter) or on the degree of polarity of the molecular species. Removing contaminants may be by ion exchange with the molecular sieve.

Still another embodiment of the invention is the controlled dehydration of the molecular sieve to induce topological changes suitable for a particular adsorption process. The topological changes may be reversible or irreversible.

A further embodiment of the invention involves the adsorption and desorption of water vapor over AlPO-77 in an adsorption heat pump-type apparatus.

Another further embodiment of the invention is a hydrocarbon conversion process using the above-described molecular sieve as a catalyst. The process comprises contacting at least one hydrocarbon with the molecular sieve at conversion conditions to generate at least one converted hydrocarbon.

DETAILED DESCRIPTION OF THE INVENTION

Figure 1:
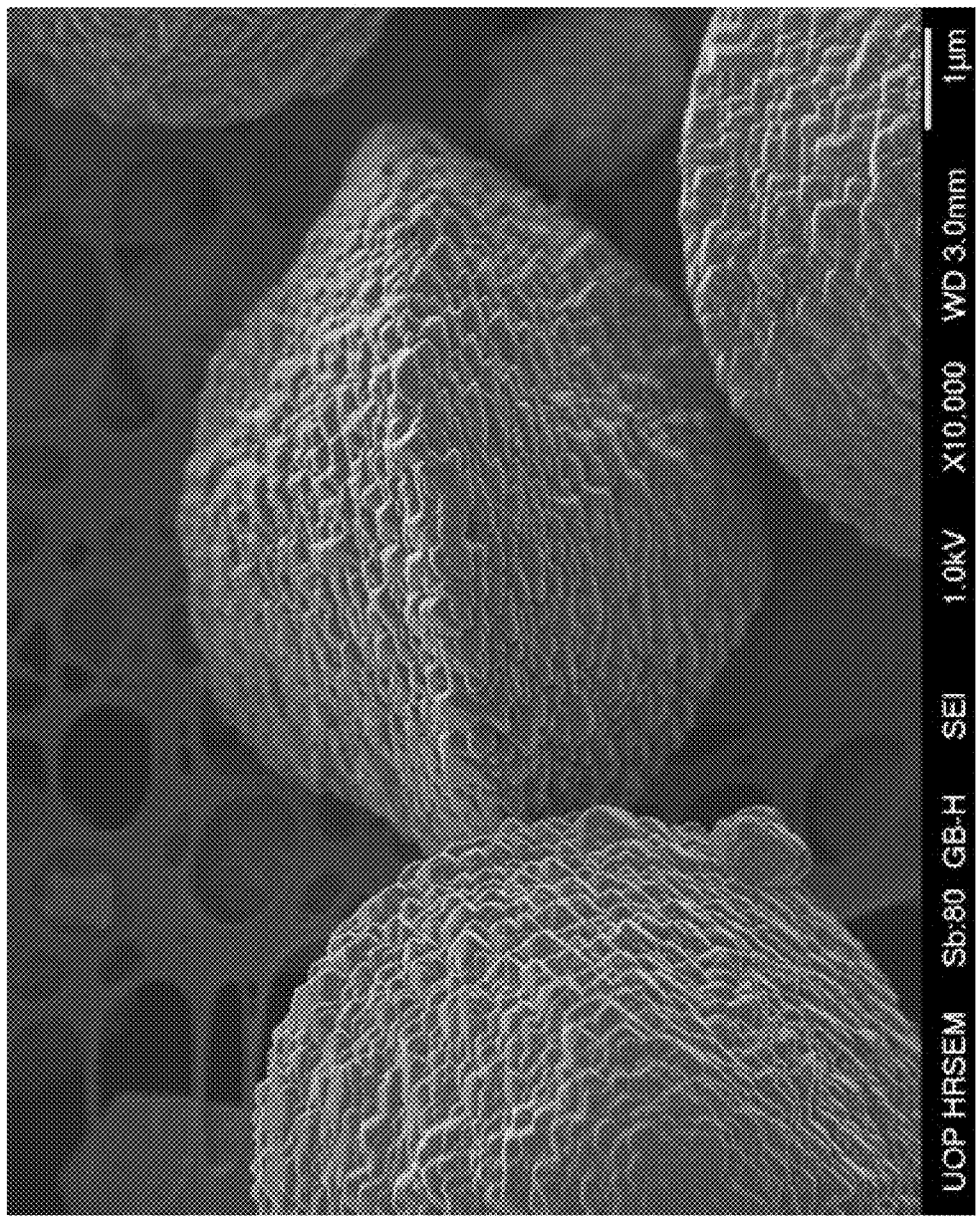
FIG. 1 is a scanning electron microscope (SEM) image of an exemplary AlPO-77 material according to an embodiment described herein.

Applicants have prepared a family of metallophosphate materials whose topological structure is unique. In their paper "Enumeration of 4-connected 3-dimensional nets and classification of framework silicates: the infinite set of ABC-6 nets; the Archimedean and σ-related nets," Smith and Bennett state "To a first approximation, all silicates belonging to the ABC-6 net family have x-ray diffraction patterns which can be indexed on a hexagonal prismatic unit cell with lattice parameters a~13.0±0.3 Å and c~p×(2.6±0.1 Å)." (See AMERICAN MINERALOGIST, 66, 777-788 (1981)). This finding has subsequently been confirmed by others (see, for example, D. Xie et al. J. AM. CHEM. SOC. 135, 10519 (2013)) as the ABC-6 family has expanded.

One particular composition of AlPO-77 indexes on a hexagonal unit cell with lattice parameters a=12.41 Å and c=23.2 Å, which is suggests an ABC-6 net structure with the stacking sequence repeating every 9 layers along the c-axis (p=23.2/2.6=8.92). In the prior art, the material SAPO-35 is known to adopt the levyne structure (LEV), which is characterized by a 9-layer stacking pattern of AABCCABBC. The stacking pattern of materials in the ABC-6 family dictates their porosity and overall largest ring size. SAPO-35 was observed to have an 8-ring as its largest ring size, which was originally determined through McBain adsorption experiments (see U.S. Pat. No. 4,440,871) and confirmed though x-ray crystallography.

In a given ABC-6 material, there exist many possible unique stacking sequences along the c-axis. As shown by Li et al., the number of possible stacking sequences increases as the length of the c-axis increases (Li, Y. et al. NAT. COMMUN. 6, #8328 (2015)). Thus, the fact that a material has similar lattice parameters to a known material in the prior art does not automatically imply that the two materials are identical. In particular, the instant microporous crystalline material (AlPO-77) is observed to have its a lattice parameter be significantly shorter than that for SAPO-35 (12.41 Å vs. >13.1 Å, respectively). We find that AlPO-77 is indeed distinct from SAPO-35 through its adsorption properties, as determined by McBain adsorption experiments, as well as through its topological connectivity, as determined by x-ray crystallography.

The instant microporous crystalline material (AlPO-77) is a microporous crystalline material having a three-dimensional framework of at least $EO_{4/2}^-$ and $PO_{4/2}^+$ tetrahedral units, and furthermore, at least one of $[M^{2+}O_{4/2}]^{2-}$ and $SiO_{4/2}$ tetrahedral units, and an empirical composition in the calcined form and anhydrous basis expressed by an empirical formula of:

$$H_w M_m^{2+} E P_x Si_y O_z$$

where H is a proton, "w" is the mole ratio of H to E and varies from 0 to 2.5. M is at least one framework divalent cation and is selected from the group consisting of alkaline earth and transition metals. Specific examples of the M cations include but are not limited to beryllium, magnesium, cobalt (II), manganese, zinc, iron(II), nickel and mixtures thereof. The value of "m" is the mole ratio of M to E and varies from 0 to about 1.0. The value of "x" is the mole ratio of P to E and varies from 0.5 to about 2.0. The ratio of silicon to E is represented by "y" which varies from about 0 to about 2.0. E is a trivalent element which is tetrahedrally coordinated, is present in the framework, and is selected from the group consisting of aluminum, gallium, iron(III) and boron. Lastly, "z" is the mole ratio of O to E and is given by the equation:

$$z=(w+2 \cdot m+3+5 \cdot x+4 \cdot y)/2.$$

The instant microporous crystalline material (AlPO-77) is typically observed to have an uptake of n-paraffins of less than 2 wt. %, as determined by McBain adsorption experiments. By contrast, the material SAPO-35 was observed by Lok et al. in U.S. Pat. No. 4,440,871 to have an uptake of n-paraffins of greater than 10 wt. %. From the adsorption data, we can conclude that the stacking pattern of AlPO-77 is not the same of SAPO-35. Hence the topology of the AlPO-77 family of materials is unique. The stacking pattern, as determined by x-ray crystallography, is observed to be ABACACBCB. This topology has is not known in the prior art for any metallophosphate species, although it has been observed by Arletti et al. as the result of the dehydration of mineral aluminosilicates (i.e., zeolites). (Arletti, R. et al. AM. MINERAL. 98, 2063 (2013)).

The microporous crystalline metallophosphate AlPO-77 is prepared by a hydrothermal crystallization of a reaction mixture prepared by combining reactive sources of E, phosphorus, and one or both of M and silicon, as well as an organic structure-directing agent (OSDA). This crystallization results in a solid precursor that can then be used to form the AlPO-77 material. A preferred form of the AlPO-77 materials is when E is Al. The sources of aluminum include but are not limited to aluminum alkoxides, precipitated aluminas, aluminum metal, aluminum hydroxide, aluminum salts and alumina sols. Specific examples of aluminum alkoxides include, but are not limited to aluminum ortho sec-butoxide and aluminum ortho isopropoxide. Sources of phosphorus include, but are not limited to, orthophosphoric acid, phosphorus pentoxide, and ammonium dihydrogen phosphate. Sources of silica include but are not limited to tetraethylorthosilicate, colloidal silica, and precipitated silica. Sources of the other E elements include but are not limited to organoammonium borates, boric acid, precipitated gallium oxyhydroxide, gallium sulfate, ferric sulfate, and ferric chloride. Sources of the M metals include the halide salts, nitrate salts, acetate salts, and sulfate salts of the respective alkaline earth and transition metals.

Synthesis of molecular sieve materials often relies on the use of organoamino or organoammonium templates known as organic structure directing agents (OSDAs). While simple OSDAs such as tetramethylammonium, tetraethylammonium and tetrapropylammonium are commercially available, oftentimes OSDAs are complicated molecules that are difficult and expensive to synthesize. However, their importance lies in their ability to impart aspects of their structural features to the molecular sieve to yield a desirable pore structure. For example, the use of 1,4,7,10,13,16-hexamethyl-1,4,7,10,13,16-hexaazacyclooctadecane as 0 SDA has been shown to allow synthesis of STA-7, an aluminophosphate based material of the SAV zeotype (Wright, et. al. J. CHEM. SOC., DALTON TRANS., 2000, 1243-1248); the use of 4,7,13,16,21,24-hexaoxa-1,10-diazabicyclo[8.8.8]hexacosane ('Kryptofix 222') led to the synthesis of AlPO$_4$-42 (Schreyeck, et. al. MICRO.MESO.MATER.1998, 22, 87-106); MAPO-35, a magnesium aluminophosphate material with the LEV topology, is disclosed in U.S. Pat. No. 4,567,029 in which quinuclidine is employed as a structure directing agent; and in U.S. Pat. No. 4,973,785, the MeAPSO composition CoAPSO-35 is disclosed, which contains both cobalt and silicon in the framework in addition to Al and P and uses methylquinuclidine as the structure directing agent.

The art clearly shows that use of complex organoammonium SDAs often results in new molecular sieve materials. However, the synthesis of these complicated organoammonium compounds is quite lengthy and requires many steps, often in an organic solvent, thereby hindering development of the new molecular sieve material. Frequently, even for simple, commercially available OSDAs, the OSDA is the most costly ingredient used in synthesizing molecular sieve materials. Consequently, it would be economically advantageous to synthesize new molecular sieves from either commercially available organoammonium SDAs or SDAs which may be readily synthesized from commercially available starting materials. This has recently been demonstrated in an elegant fashion using simple aqueous chemistry to generate a novel family of organo-1-oxa-4-azonium cyclohexane compounds (U.S. Pat. No. 9,522,896, incorporated by reference in its entirety), derived from morpholino-based compounds. This procedure thereby allows the preparation of SDAs, such as unusual quaternary ammonium salts, from readily available starting reagents in a facile and practical manner. OSDAs prepared by the methods of the present invention are in aqueous solution and do not pose odor and flashpoint concerns. The result is the unprecedented ability to remove the cooling step typically required in the preparation of in-situ zeolite reaction mixtures and to avoid purification steps such as evaporation of organic solvent typically required in ex-situ preparation methods. The obtained organoammonium bromide salt can be ion-exchanged, either by reaction with $Ag_2O$ or by anion exchange resins to yield the hydroxide form of the organoammonium compound, or used as the halogen salt directly.

For the synthesis of AlPO-77 precursor material, R may be an organoammonium cation prepared from the reaction of an aqueous mixture of a cyclic secondary amine and an organic dihalide. Specific examples of cyclic secondary amines include, without limitation, piperidine, homopiperidine, pyrrolidine, and morpholine. Specific examples of organic dihalides include, without limitation, 1,4-dibromobutane, 1,5-dibromopentane, and 1,6-dibromohexane.

In one embodiment, the cyclic secondary amine is morpholine and the organic dihalide is 1,4-dibromobutane.

In another embodiment, the cyclic secondary amine is morpholine and the organic dihalide is 1,4-dibromopentane.

In another embodiment, the cyclic secondary amine is morpholine and the organic dihalide is 1,5-dibromopentane.

In another embodiment, the cyclic secondary amine is a non-N-substituted morpholine and the organic dihalide is 1,4-dibromobutane. Non-N-substituted morpholines include, but are not limited to, 2-methylmorpholine, 3-methylmorpholine, 2,3-dimethylmorpholine, 2,5-dimethylmorpholine, 2,6-dimethylmorpholine, 2,2-dimethylmorpholine, and 3,3-dimethylmorpholine.

Alternatively, R may also be an acyclic organoammonium cation, examples of which include but are not limited to ethyltrimethylammonium (ETMA$^+$), choline [$Me_3NCH_2CH_2OH$]$^+$, trimethylpropylammonium, diethyldimethylammonium (DEDMA$^+$), tetramethylammonium (TMA$^+$) tetraethylammonium (TEA$^+$), tetrapropylammonium (TPA$^+$) and mixtures thereof.

In one embodiment R is ETMA$^+$. In another embodiment, R is a combination of ETMA$^+$ and at least one organoammonium cation selected from the group consisting of choline, DEDMA$^+$, TMA$^+$, trimethylpropylammonium, TEA$^+$, and TPA$^+$.

The reaction mixture containing reactive sources of the desired components can be described in terms of molar ratios of the oxides by the formula:

$$aR_2O:bMO:E_2O_3:cP_2O_5:dSiO_2:eH_2O$$

where "a" has a value of about 0.75 to about 12, "b" has a value of about 0 to about 2, "c" has a value of about 0.5 to about 8, "d" has a value of about 0 to about 4, and "e" has a value from 30 to 1000. If alkoxides are used, it is preferred to include a distillation or evaporative step to remove the alcohol hydrolysis products.

The reaction mixture is reacted at a temperature of about 60° C. to about 200° C. and preferably from about 125° C. to about 175° C. for a period of about 1 day to about 21 days and preferably for a time of about 2 days to about 10 days in a sealed reaction vessel at autogenous pressure. The reaction vessel may be heated with stirring, heated while tumbling, or heated quiescently. After crystallization is complete, the solid product is isolated from the heterogeneous mixture by means such as filtration or centrifugation, and then washed with deionized water and dried in air at ambient temperature up to about 100° C. AlPO-77 seeds can optionally be added to the reaction mixture in order to accelerate the formation of the desired microporous composition.

The material obtained after drying the hydrothermal synthesis products at 100° C., is characterized by the x-ray following diffraction pattern, having at least the d-spacings and relative intensities set forth in Table 3:

TABLE 3

| 2-Theta | d(Å) | Intensity |
|---|---|---|
| 8.55-8.87 | 10.33-9.96 | w |
| 10.76-10.89 | 8.21-8.11 | s-vs |
| 11.16-11.35 | 7.92-7.79 | w-m |
| 13.44-13.58 | 6.58-6.51 | m |
| 15.97-16.13 | 5.54-5.49 | w |
| 16.85-17.11 | 5.26-5.18 | m-s |
| 17.26-17.43 | 5.13-5.08 | vs |
| 17.54-17.72 | 5.05-5.00 | m-s |
| 20.28-20.50 | 4.37-4.32 | s |
| 20.96-21.10 | 4.23-4.21 | m |
| 21.63-21.82 | 4.10-4.07 | s |
| 21.95-22.13 | 4.04-4.01 | vs |
| 22.55-22.80 | 3.94-3.90 | m |
| 23.41-23.59 | 3.80-3.77 | m-s |
| 24.44-24.66 | 3.64-3.61 | m |
| 25.56-25.78 | 3.48-3.45 | vw-w |
| 27.10-27.35 | 3.29-3.27 | m-s |
| 27.47-27.79 | 3.24-3.21 | s-vs |
| 28.00-28.28 | 3.18-3.15 | m-s |
| 29.22-29.45 | 3.05-3.03 | w |
| 30.72-31.00 | 2.91-2.88 | m |
| 32.27-32.57 | 2.77-2.75 | m-s |
| 33.68-34.04 | 2.66-2.63 | m-s |
| 34.11-34.37 | 2.63-2.61 | m-s |
| 36.79-37.13 | 2.44-2.42 | vw-w |

The AlPO-77 material is obtained by calcination of the above precursor material in either air or nitrogen to remove the occluded template. In one embodiment of the invention, the AlPO-77 precursor material is calcined at a temperature of at least 500° C. in order to obtain AlPO-77. In another embodiment of the invention, the AlPO-77 precursor material is calcined at a temperature of at least 600° C. in order to obtain AlPO-77. The obtained AlPO-77, essentially free of organic material, may be characterized by the x-ray diffraction pattern, having at least the d-spacings and relative intensities set forth in Table 4 below:

TABLE 4

| 2-Theta | d(Å) | Intensity |
|---|---|---|
| 8.73-9.35 | 10.12-9.48 | w-m |
| 11.06-11.55 | 7.99-7.65 | m-s |
| 13.60-13.84 | 6.50-6.39 | m-vs |
| 14.11-14.71 | 6.27-6.01 | w-s |

TABLE 4-continued

| 2-Theta | d(Å) | Intensity |
| --- | --- | --- |
| 17.41-17.93 | 5.09-4.94 | s |
| 20.89-21.57 | 4.25-4.11 | m-s |
| 22.27-22.67 | 3.99-3.92 | s |
| 24.55-24.82 | 3.62-3.58 | w-m |
| 25.22-25.53 | 3.53-3.48 | w-m |
| 26.63-27.40 | 3.34-3.25 | w-m |
| 28.45-28.83 | 3.13-3.09 | s |
| 29.02-29.61 | 3.07-3.01 | m-s |
| 32.65-32.80 | 2.74-2.73 | w |
| 33.02-33.18 | 2.71-2.70 | w-m |
| 34.91-35.34 | 2.57-2.54 | m |

The AlPO-77 material can be characterized on an anhydrous basis by the empirical formula:

$$H_w M_m^{2+} E P_x Si_y O_z$$

where M is at least one metal cation of valence +2 selected from the group consisting of $Be^{2+}$, $Mg^{2+}$, $Zn^{2+}$, $Co^{2+}$, $Mn^{2+}$, $Fe^{2+}$, $Ni^{2+}$, "m" is the mole ratio of M to E and varies from 0 to about 1.0, H is a proton, "w" is the mole ratio of H to E and has a value of about 0 to about 2.5, E is a trivalent element selected from the group consisting of aluminum, gallium, iron, boron and mixtures thereof, "x" is mole ratio of P to E and varies from 0.5 to about 2.0, "y" is the mole ratio of Si to E and varies from 0 to about 2.0 and "z" is the mole ratio of O to E and has a value determined by the equation:

$$z=(w+2\cdot m+3+5\cdot x+4\cdot y)/2.$$

The crystalline AlPO-77 materials of this invention can be used for separating mixtures of molecular species, removing contaminants through ion exchange and catalyzing various hydrocarbon conversion processes. Separation of molecular species can be based either on the molecular size (kinetic diameter) or on the degree of polarity of the molecular species. It is observed that the desired adsorption properties of the AlPO-77 can be affected by the manner in which the AlPO-77 is activated; i.e., the manner in which the AlPO-77 is dehydrated following removal of the template by calcination.

In one embodiment, the AlPO-77, which is essentially free of organic species, is allowed to fully re-hydrate and then activated by drying in ambient atmosphere at 100-250° C. When treated in this manner, the AlPO-77 is observed to uptake less than 1 wt. % n-paraffins.

In another embodiment, the AlPO-77, which is essentially free of organic species, is allowed to fully re-hydrate and then activated by drying in ambient atmosphere at 100-400° C. When treated in this manner, the AlPO-77 is observed to uptake less than 2 wt. % n-paraffins.

In still another embodiment, the AlPO-77, which is essentially free of organic species, is allowed to fully re-hydrate and then activated by drying under vacuum at 300-500° C. When treated in this manner, the AlPO-77 is observed to uptake less than 2 wt. % n-paraffins.

In yet another embodiment, the AlPO-77, which is essentially free of organic species, is allowed to fully re-hydrate and then activated by drying under vacuum at 100-200° C. When treated in this manner, the AlPO-77 is observed to uptake less than 7 wt. % n-paraffins.

In one embodiment, the re-hydrated AlPO-77 is activated for adsorption processes by evacuating under vacuum of at least $10^{-2}$ Torr, of at least $10^{-3}$ Torr, prior to heating at 200-400° C.

In another embodiment, the re-hydrated AlPO-77 is activated for adsorption processes by rapidly heating to 200-400° C. while simultaneously evacuating under vacuum of at least $10^{-2}$ Torr, of at least $10^{-3}$ Torr.

The AlPO-77 compositions of this invention can also be used as a catalyst or catalyst support in various hydrocarbon conversion processes. Hydrocarbon conversion processes are well known in the art and include cracking, hydrocracking, alkylation of both aromatics and isoparaffin, isomerization, polymerization, reforming, hydrogenation, dehydrogenation, transalkylation, dealkylation, hydration, dehydration, hydrotreating, hydrodenitrogenation, hydrodesulfurization, methanol to olefins, methanation and syngas shift process. Specific reaction conditions and the types of feeds which can be used in these processes are set forth in U.S. Pat. Nos. 4,310,440, 4,440,871 and 5,126,308, which are incorporated by reference.

The adsorptive properties of the AlPO-77 material can be controlled by the manner in which they are dehydrated. As such, one embodiment of the invention is the process in which the AlPO-77 is dehydrated, which gives the desired adsorption characteristics.

The AlPO-77 materials of this invention can further be used as an adsorbent for water vapor. The adsorbent may be a component of an adsorption heat pump apparatus. Adsorbents used for adsorption heat pump purposes are desired to have a high capacity for water vapor, as well as a large crystallographic density. The crystallographic density of microporous crystalline materials is conveniently expressed in units of T-atom/1000 $Å^3$. Generally speaking, adsorbents with a low density can be problematic since they would require a large volume of material to take up a given quantity of adsorbate. This can be troublesome if space is limited in the application. It is thus of interest to consider uptake capacity on a volumetric basis as opposed to a gravimetric basis. As measured, AlPO-77 has superior water capacity (on a volumetric basis) to both SAPO-34 and SAPO-5, which are preferred silicoaluminophosphate materials for use in adsorption heat pumps (see U.S. Pat. Nos. 7,422,993, 9,517,942). Thus, AlPO-77 could be a preferred material for use in adsorption heat pumps.

The following examples are presented in illustration of this invention and are not intended as undue limitations on the generally broad scope of the invention as set out in the appended claims. The products will be designated with names that contain the suffix "-77" to indicate the "-77" structure and prefix that reflects the compositional nature of the product, such as "SAPO" for a silicoaluminophosphate, "ZnAPO" for a zinc aluminophosphate, and "MgAPSO" for a magnesium silicoaluminophosphate, etc.

The structure of the AlPO-77 compositions of this invention was determined by x-ray analysis. The x-ray patterns presented in the following examples were obtained using standard x-ray powder diffraction techniques. The radiation source was a high-intensity, x-ray tube operated at 45 kV and 35 mA. The diffraction pattern from the copper K-alpha radiation was obtained by appropriate computer based techniques. Flat compressed powder samples were continuously scanned at 2° to 56° (2θ). Interplanar spacings (d) in Angstrom units were obtained from the position of the diffraction peaks expressed as θ where θ is the Bragg angle as observed from digitized data. Intensities were determined from the integrated area of diffraction peaks after subtracting background, "$I_o$," being the intensity of the strongest line or peak, and "I" being the intensity of each of the other peaks.

As will be understood by those skilled in the art, the determination of the parameter 2θ is subject to both human and mechanical error, which in combination can impose an uncertainty of about ±0.4° on each reported value of 2θ. This uncertainty is, of course, also manifested in the reported values of the d-spacings, which are calculated from the 2θ values. This imprecision is general throughout the art and is not sufficient to preclude the differentiation of the present crystalline materials from each other and from the compositions of the prior art. In some of the x-ray patterns reported, the relative intensities of the d-spacings are indicated by the notations vs, s, m, w, and vw which represent very strong, strong, medium, weak, and very weak respectively. In terms of $100 \times I/I_o$, the above designations are defined as:

vw=0-5; w=5-15; m=15-40: s=40-75 and vs=75-100.

In certain instances the purity of a synthesized product may be assessed with reference to its x-ray powder diffraction pattern. Thus, for example, if a sample is stated to be pure, it is intended only that the x-ray pattern of the sample is free of lines attributable to crystalline impurities, not that there are no amorphous materials present.

In order to more fully illustrate the invention, the following examples are set forth. It is to be understood that the examples are only by way of illustration and are not intended as an undue limitation on the broad scope of the invention as set forth in the appended claims.

Example 1

102.3 g propyltrimethylammonium (PTMA) hydroxide, (aq, 21.9%) was weighed into a plastic bottle equipped with a magnetic stir bar. 7.99 g of tetraethylorthosilicate was then added. The bottle was sealed and stirred overnight. The following morning, 38.18 g of Al tri-sec-butoxide (97%) was added. The mixture was stirred until a clear solution was achieved. While mixing with an overhead stirrer, 21.69 g of 85% $H_3PO_4$ was slowly added. 4.84 g of deionized water was added while mixing. The reaction mixture was then stirred for an additional 2 hours. The final reaction mixture was a cloudy suspension. The reaction mixture was transferred to a 0.3 L stirred autoclave and heated to 175° C. The reaction was held at 175° C. for 5 days with 250 rpm stirring. The product was collected and washed by centrifugation. The product was then dried at 100° C. X-ray fluorescence, Leco CHN, and LOI analyses on the product gave the empirical composition [(PTMA)$Al_4P_3Si$]. A portion of the solid was then calcined by heating to 500° C. in air at a rate of 2° C./min. The sample was held at 500° C. for 4 h before allowing to cool in air. Once at room temperature, the calcined material was allowed to re-hydrate for 24 hours. The calcined material was then heated and dried for 4 hours at 150° C. on the hot stage of a Rigaku diffractometer before a kapton cover was placed on the sample, which was then allowed to cool. XRD analysis of this material revealed the following lines:

TABLE 5

| 2-Θ | d(Å) | I/I$_o$ |
|---|---|---|
| 9.259 | 9.5437 | w |
| 11.53 | 7.6686 | m |
| 14.62 | 6.054 | s |
| 14.992 | 5.9045 | w |
| 17.85 | 4.9651 | s |
| 21.41 | 4.1469 | m |
| 23.061 | 3.8536 | m |
| 25.4 | 3.5038 | m |
| 27.361 | 3.2569 | w |
| 29.54 | 3.0215 | m |

Analysis by x-ray diffraction after this treatment identified the material as SAPO-77.

Example 2

A portion of the solid from Example 1 was activated by evacuating the sample under high vacuum and then heating to 400° C. for 16 hr. BET surface area measurements, which showed the SAPO-77 adsorption conformed to a flat Type 1 isotherm, indicated a surface area of 487 m²/g, a micropore volume of 0.249 cc/g and a total pore volume of 0.264 cc/g.

Example 3

A portion of the solid from Example 1 was activated by heating to 400° C. and then evacuating under vacuum. In a McBain adsorption experiment, it was found that this SAPO-77 adsorbed 0.86 wt. % n-butane, a result consistent with the absence of an 8-ring in the material.

Example 4

A portion of the calcined solid from Example 1 was activated by heating to 100° C. and then evacuating under vacuum. In a McBain adsorption experiment, it was found that this SAPO-77 adsorbed 6.27 wt. % n-butane.

Example 5

591.2 g of water was weighed into a 2 L Teflon bottle. 436.2 g of 1,4-dibromobutane (99%) was added. To this mixture, 352.0 g of morpholine (99%) was added under magnetic stirring. The water and morpholine combined to form a cloudy phase while the denser 1,4-dibromobutane remained on the bottom. The Teflon bottle was placed under an overheard mixer and stirred somewhat vigorously. After 15-20 minutes a clear light yellow template solution is formed. 197.1 g water was then added to make the final solution 50% water by weight.

Example 6

1000.0 g of the solution from Example 5 was contacted with 304.6 g of $Ag_2O$ in a round-bottom flask, which combined to form a grey opaque solution. The flask was placed under a high speed overheard stirrer for stirring at room temperature for 1 day. The sample was filtered to remove the precipitated silver bromide and the final solution was sent for water analysis, which showed that the sample was composed of 68.0% water.

Example 7

141.88 g of the product of Example 6 was combined with 18.24 g of Al(OH)$_3$ (Al=27.9%). 1.92 g of Ludox AS-40 (Sigma-Aldrich) was added to the gel followed by 47.10 g of 85% (w/w) phosphoric acid. Following this step, 9.48 g of a 28.3% (w/w) magnesium acetate solution was added to the gel. The gel was then stirred vigorously for 2 hours. The final gel mixture was transferred into a 300 cc stirred autoclave and digested for two days at 170° C., stirring at 150 RPM. Afterwards, the gel was cooled to room temperature, the products were isolated by centrifugation, and the solids dried at 100° C. overnight. X-ray diffraction analysis of the solids revealed the following lines:

TABLE 6

| 2-Theta | d(Å) | Intensity |
|---|---|---|
| 8.67 | 10.19 | w |
| 10.83 | 8.16 | s |
| 11.27 | 7.85 | m |
| 13.52 | 6.54 | m |
| 16.07 | 5.51 | w |
| 16.97 | 5.22 | s |
| 17.35 | 5.11 | vs |
| 17.65 | 5.02 | s |
| 20.40 | 4.35 | s |
| 21.06 | 4.22 | m |
| 21.74 | 4.08 | s |
| 22.06 | 4.03 | vs |
| 22.72 | 3.91 | m |
| 23.52 | 3.78 | m |
| 24.55 | 3.62 | m |
| 25.71 | 3.46 | vw |
| 27.23 | 3.27 | m |
| 27.61 | 3.23 | s |
| 28.14 | 3.17 | m |
| 29.36 | 3.04 | w |
| 30.86 | 2.90 | m |
| 32.45 | 2.76 | m |
| 33.81 | 2.65 | m |
| 34.21 | 2.62 | m |
| 36.98 | 2.43 | vw |

Elemental analysis of this material showed a composition in weight percent of 1.86% Si, 18.5% Al, 25.1% P and 3.25% Mg (all volatile-free), consistent with the stoichiometry $Mg_{0.134}AlP_{1.18}Si_{0.097}$.

Example 8

The product of Example 7 was calcined in air at 600° C. in a muffle furnace. The furnace was ramped at 2° C./min to the target temperature. After calcination for 4 hours at 600° C., the sample was cooled to room temperature and allowed to fully re-hydrate. XRD analysis of the calcined and re-hydrated material revealed the following lines:

TABLE 7

| 2-Theta | d(Å) | Intensity |
|---|---|---|
| 8.80 | 10.04 | w |
| 11.14 | 7.94 | s |
| 13.66 | 6.48 | vs |
| 14.21 | 6.23 | m |
| 17.53 | 5.06 | s |
| 21.06 | 4.22 | m |
| 22.48 | 3.95 | s |
| 24.65 | 3.61 | m |
| 25.42 | 3.50 | m |
| 26.76 | 3.33 | w |
| 28.64 | 3.11 | s |
| 29.14 | 3.06 | m |
| 32.75 | 2.73 | w |
| 33.07 | 2.71 | w |
| 35.05 | 2.56 | m |

The product was identified by XRD as MgSAPO-77. The surface area of the MgSAPO-77 (measured by nitrogen adsorption at 77 K) was determined to be 132 m²/g, and the micropore volume was determined to be 0.046 cm³/g. McBain adsorption experiments on the calcined MgSAPO-77 revealed the following uptake behavior:

TABLE 8

| Molecule | Pressure (torr) | Wt. % Uptake |
|---|---|---|
| $H_2O$ | 4.6 | 23.8 |
| $CO_2$ | 250 | 5.4 |
| $n-C_4H_{10}$ | 700 | 1.3* |

*Sample adsorbed over 24 hours.

Example 9

105.37 g of the product of Example 6 was combined with 15.00 g of alumina trihydrate (Al=34.5%). 1.42 g of Ludox AS-40 (Sigma-Aldrich) was added to the gel followed by 34.98 g 85% phosphoric acid. Following this step, 9.65 g of a 28.3% (w/w) magnesium acetate solution was added to the gel. The gel was then stirred vigorously for 2 hours. The final gel mixture was transferred into a 300 cc stirred autoclave and was aged for 24 hours at 100° C. and then digested for two days at 170° C., stirring at 150 RPM. Afterwards, the gel was cooled to room temperature, the products were isolated by centrifugation, and the solids dried at 100° C. overnight. Elemental analysis of this material showed a composition in weight percent of 1.41% Si, 18.1% Al, 24.3% P and 3.23% Mg (all volatile-free), consistent with the stoichiometry $Mg_{0.198}AlP_{1.17}Si_{0.075}$.

Example 10

The product from Example 9 was calcined in air at 600° C. in a muffle furnace. The furnace was ramped at 2° C./min to the target temperature. After calcination for 4 hours at 600° C., the sample was cooled to room temperature, allowed to rehydrate, and then dehydrated by heating in air at 150° C. for 12 hours. This material was identified by XRD as MgSAPO-77. The surface area of the calcined MgSAPO-77 (measured by nitrogen adsorption at 77 K) was determined to be 19 m²/g. McBain adsorption experiments on the calcined MgSAPO-77 revealed the following uptake behavior:

TABLE 9

| Molecule | Pressure (torr) | Wt. % Uptake |
|---|---|---|
| $H_2O$ | 4.6 | 10.1 |
| $CO_2$ | 250 | 0.6 |
| $n-C_4H_{10}$ | 700 | 0.2 |

Example 11

105.37 g of the product of Example 6 was combined with 15.00 g of alumina trihydrate (Al=34.5%). 1.42 g of Ludox AS-40 (Sigma-Aldrich) was added to the gel followed by 34.98 g of 85% phosphoric acid. Following this step, 4.82 g of a 28.3% (w/w) magnesium acetate solution was added to the gel. The gel was then stirred vigorously for 2 hours. The final gel mixture was transferred into a 300 cc stirred autoclave, was aged for 24 hours at 100° C. and then digested for three days at 160° C., stirring at 150 RPM. Afterwards, the gel was cooled to room temperature, the products were isolated by centrifugation, and the solids dried at 100° C. overnight. Elemental analysis of this material showed a composition in weight percent of 1.55% Si, 18.3% Al, 24.4% P and 3.10% Mg (all volatile-free), consistent with the stoichiometry $Mg_{0.188}AlP_{1.16}Si_{0.081}$.

Example 12

The product from Example 11 was calcined in air at 600° C. in a muffle furnace. The furnace was ramped at 2° C./min to the target temperature. After calcination for 4 hours at 600° C., the sample was cooled to room temperature, allowed to rehydrate, and then dehydrated by heating in air at 150° C. for 12 hours. This material was identified by XRD as MgSAPO-77. McBain adsorption experiments on the calcined MgSAPO-77 revealed the following uptake behavior:

TABLE 10

| Molecule | Pressure (torr) | Wt. % Uptake |
|---|---|---|
| $H_2O$ | 4.6 | 15.0 |
| $CO_2$ | 250 | 0.6 |
| $n-C_4H_{10}$ | 700 | 0.6 |

Example 13

35.47 g of the product of Example 6 was combined with 4.56 g of aluminum hydroxide (Al=27.9%)). 0.48 g of Ludox AS-40 (Sigma-Aldrich) was added to the gel followed by 11.77 g 85% phosphoric acid. Following this step, of a 25.0% (w/w) cobalt acetate solution was added to the gel. The gel was then stirred vigorously for 2 hours. The final gel mixture was transferred into a static 45-mL autoclave and then digested for 4 days at 150° C. Afterwards, the gel was cooled to room temperature, the products were isolated by centrifugation, and the solids dried at 100° C. overnight. The dried material was calcined in air at 600° C. in a muffle furnace. The furnace was ramped at 2° C./min to the target temperature. After calcination for 4 hours at 600° C., the sample was cooled to room temperature and allowed to fully re-hydrate. The product of this synthesis was identified as CoSAPO-77 plus a trace amount of an unknown phase by XRD.

Example 14

141.89 g of the product of Example 6 was combined with 18.24 g of aluminum hydroxide (Al=27.9%)). 1.92 g of Ludox AS-40 (Sigma-Aldrich) was added to the gel followed by 47.10 g 85% phosphoric acid. The gel was then stirred vigorously for 2 hours. The final gel mixture was transferred into a 300 cc stirred autoclave and then digested for 2 days at 170° C., stirring at 150 RPM. Afterwards, the gel was cooled to room temperature, the products were isolated by centrifugation, and the solids dried at 100° C. overnight. The dried material was calcined in air at 600° C. in a muffle furnace. The furnace was ramped at 2° C./min to the target temperature. After calcination for 4 hours at 600° C., the sample was cooled to room temperature and allowed to fully re-hydrate. The product of this synthesis was identified as SAPO-77 plus a trace amount of an unknown phase by XRD.

Comparative Example 1

SAPO-34 was synthesized following Example 35 of U.S. Pat. No. 4,440,871, herein incorporated by reference. After the as-synthesized SAPO-34 was isolated from the mother liquor and dried, it was calcined at 600° C. for 4 hours in air. XRD analysis of the calcined material showed that the product was pure SAPO-34.

Comparative Example 2

SAPO-5 was synthesized following Example 12 of U.S. Pat. No. 4,440,871, incorporated herein by reference. After the as-synthesized SAPO-5 was isolated from the mother liquor and dried, it was calcined at 600° C. for 4 hours in air. XRD analysis of the calcined material showed that the product was pure SAPO-5.

Example 15

Figure 2:
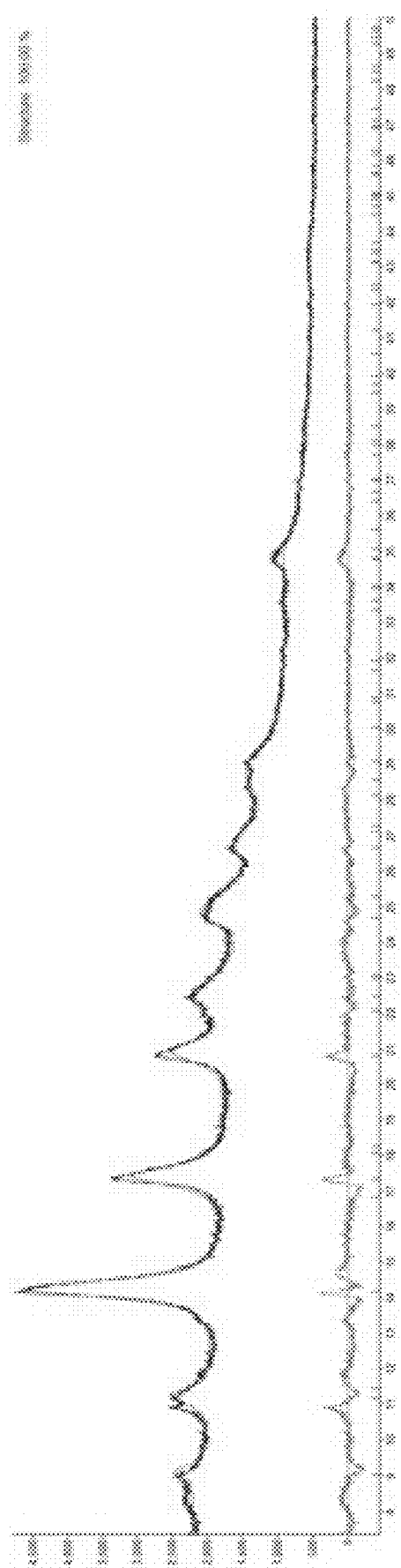
FIG. 2 is an x-ray diffraction pattern of the AlPO-77 material overlaid against a theoretical pattern of the novel crystal structure. The novel crystal structure can be represented by an ABC-6-net material with an ABACACBCB stacking pattern
Figure 3:
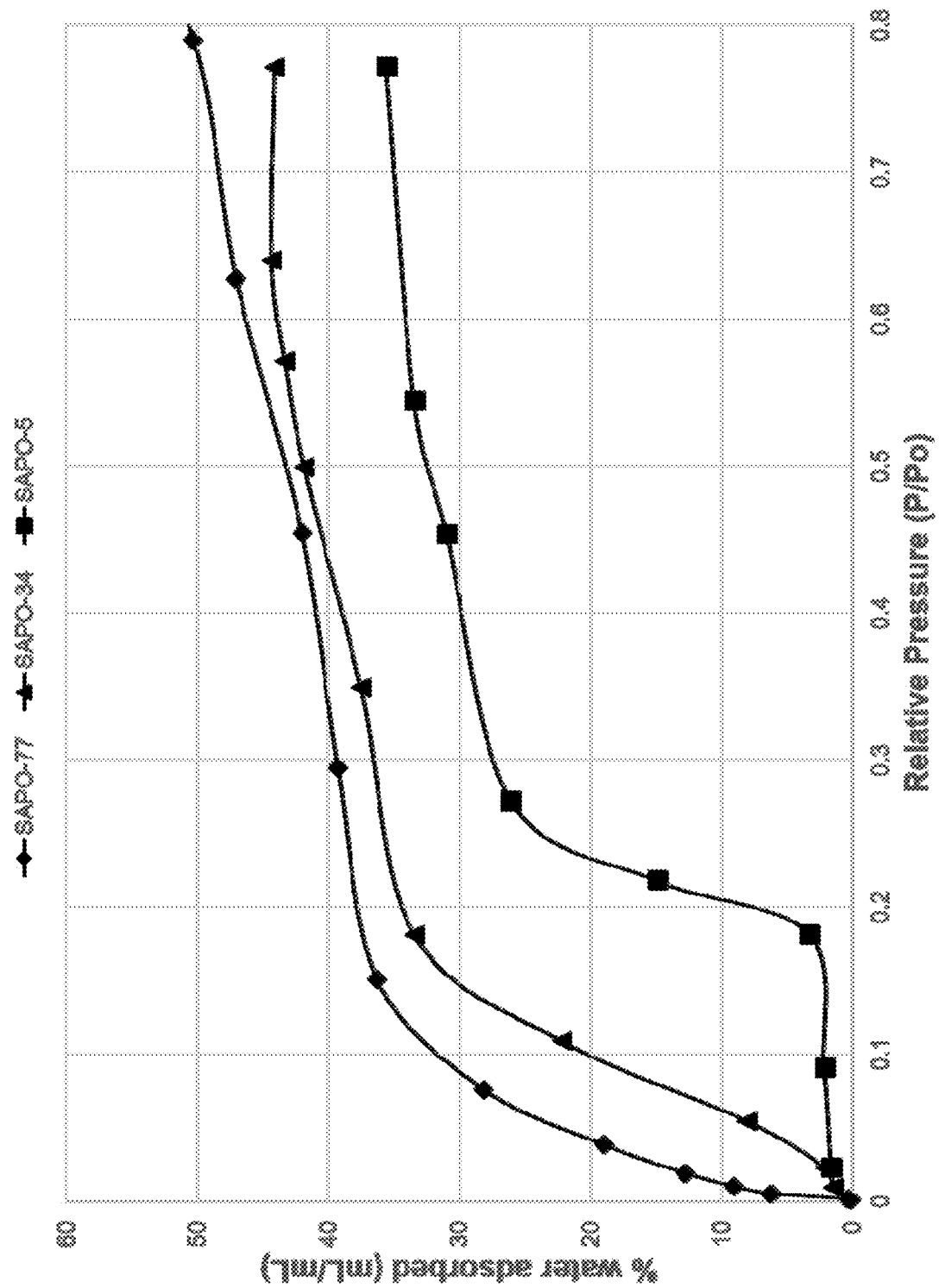
FIG. 3 is a graph showing water adsorption isotherms of exemplary AlPO-77 materials along with comparative example materials. Details are discussed in Example 15.

The products of Example 8, Comparative Example 1, and Comparative Example 2 were tested for water vapor adsorption in a McBain gravimetric balance. Prior to water vapor adsorption, the materials heated at 400° C. under vacuum. Water adsorption isotherms were recorded for each material at 25° C., and are displayed in FIG. 2. Saturation capacities were measured in terms of mass %, then converted to volume % using the crystal density of each framework, which is determined from the unit cell of each material. The results are displayed in Table 11:

TABLE 11

| Material | Saturation Capacity (mass %) | Crystal Density (g/mL) | Volumetric Capacity (vol %) |
|---|---|---|---|
| MgSAPO-77 | 28.9 | 1.74 | 50.3 |
| SAPO-34 | 31.0 | 1.43 | 44.3 |
| SAPO-5 | 20.3 | 1.75 | 35.6 |

It is seen that MgSAPO-77 has superior volumetric capacity for water vapor over the comparative examples SAPO-34 and SAPO-5.

SPECIFIC EMBODIMENTS

While the following is described in conjunction with specific embodiments, it will be understood that this description is intended to illustrate and not limit the scope of the preceding description and the appended claims.

A first embodiment of the invention is a microporous crystalline material comprising a three-dimensional framework of at least $EO_{4/2}-$ and $PO_{4/2}+$ tetrahedral units and optionally, at least one of $[M^{2+}O_{4/2}]2-$ and $SiO_{4/2}$ tetrahedral units and an empirical composition in the as-synthesized form and anhydrous basis expressed by an empirical formula of $R^+_r M_m^{2+} EP_x Si_y O_z$ where M is at least one metal cation of valence +2 selected from the group consisting of $Be^{2+}$, $Mg^{2+}$, $Zn^{2+}$, $Co^{2+}$, $Mn^{2+}$, $Fe^{2+}$, $Ni^{2+}$, "m" is the mole ratio of M to E and varies from 0 to about 1.0, and R is an organoammonium cation. "r" is the mole ratio of R to E and has a value of about 0.1 to about 2.5, E is a trivalent element selected from the group consisting of aluminum, gallium, iron, boron and mixtures thereof, "x" is mole ratio of P to E and varies from 0.5 to about 2.0, "y" is the mole ratio of Si to E and varies from 0 to about 2.0, and "z" is the mole ratio of O to E and has a value determined by the equation $z=(2 \cdot m + r + 3 + 5 \cdot x + 4 \cdot y)/2$ wherein the material is characterized in that it has the x-ray diffraction pattern having at least the d-spacings and intensities set forth in Table 2.

TABLE 2

| 2-Theta | d(Å) | Intensity |
|---|---|---|
| 8.55-8.87 | 10.33-9.96 | w |
| 10.76-10.89 | 8.21-8.11 | s-vs |

TABLE 2-continued

| 2-Theta | d(Å) | Intensity |
|---|---|---|
| 11.16-11.35 | 7.92-7.79 | w-m |
| 13.44-13.58 | 6.58-6.51 | m |
| 15.97-16.13 | 5.54-5.49 | w |
| 16.85-17.11 | 5.26-5.18 | m-s |
| 17.26-17.43 | 5.13-5.08 | vs |
| 17.54-17.72 | 5.05-5.00 | m-s |
| 20.28-20.50 | 4.37-4.32 | s |
| 20.96-21.10 | 4.23-4.21 | m |
| 21.63-21.82 | 4.10-4.07 | s |
| 21.95-22.13 | 4.04-4.01 | vs |
| 22.55-22.80 | 3.94-3.90 | m |
| 23.41-23.59 | 3.80-3.77 | m-s |
| 24.44-24.66 | 3.64-3.61 | m |
| 25.56-25.78 | 3.48-3.45 | vw-w |
| 27.10-27.35 | 3.29-3.27 | m-s |
| 27.47-27.79 | 3.24-3.21 | s-vs |
| 28.00-28.28 | 3.18-3.15 | m-s |
| 29.22-29.45 | 3.05-3.03 | w |
| 30.72-31.00 | 2.91-2.88 | m |
| 32.27-32.57 | 2.77-2.75 | m-s |
| 33.68-34.04 | 2.66-2.63 | m-s |
| 34.11-34.37 | 2.63-2.61 | m-s |
| 36.79-37.13 | 2.44-2.42 | vw-w | and wherein after being calcined or calcined and activated, the material comprises a three-dimensional framework of at least $EO_{4/2}^-$ and $PO_{4/2}^+$ tetrahedral units, and furthermore, at least one of $[M^{2+}O_{4/2}]^{2-}$ and $SiO_{4/2}$ tetrahedral units and an empirical composition on an anhydrous basis expressed by an empirical formula of $H_w M_m^{2+} E P_x Si_y O_z$ where H is a proton, "w" is the mole ratio of H to E and varies from 0 to 2.5, M is at least one metal cation of valence +2 selected from the group consisting of $Be^{2+}$, $Mg^{2+}$, $Zn^{2+}$, $Co^{2+}$, $Mn^{2+}$, $Fe^{2+}$, $Ni^{2+}$, "m" is the mole ratio of M to E and varies from 0 to about 1.0, E is a trivalent element selected from the group consisting of aluminum, gallium, iron, boron and mixtures thereof, "x" is mole ratio of P to E and varies from 0.5 to about 2.0, "y" is the mole ratio of Si to E and varies from 0 to about 2.0 and "z" is the mole ratio of O to E and has a value determined by the equation $z=(w+2\cdot m+3+5\cdot x+4\cdot y)/2$ and wherein the material has a x-ray diffraction pattern having at least the d-spacings and intensities set forth in Table 1.

TABLE 1

| 2-Theta | d(Å) | Intensity |
|---|---|---|
| 8.73-9.35 | 10.12-9.48 | w-m |
| 11.06-11.55 | 7.99-7.65 | m-s |
| 13.60-13.84 | 6.50-6.39 | m-vs |
| 14.11-14.71 | 6.27-6.01 | w-s |
| 17.41-17.93 | 5.09-4.94 | s |
| 20.89-21.57 | 4.25-4.11 | m-s |
| 22.27-22.67 | 3.99-3.92 | s |
| 24.55-24.82 | 3.62-3.58 | w-m |
| 25.22-25.53 | 3.53-3.48 | w-m |
| 26.63-27.40 | 3.34-3.25 | w-m |
| 28.45-28.83 | 3.13-3.09 | s |
| 29.02-29.61 | 3.07-3.01 | m-s |
| 32.65-32.80 | 2.74-2.73 | w |
| 33.02-33.18 | 2.71-2.70 | w-m |
| 34.91-35.34 | 2.57-2.54 | m |

An embodiment of the invention is one, any or all of prior embodiments in this paragraph up through the first embodiment in this paragraph wherein the calcined microporous material indexes on a unit cell with hexagonal axes with lattice parameters a=12.41 Å and c=23.2 Å. An embodiment of the invention is one, any or all of prior embodiments in this paragraph up through the first embodiment in this paragraph wherein comprising an ABC-6 net structure with a stacking sequence repeating every 9 layers along the c-axis (p=23.2/2.6=8.92).

A second embodiment of the invention is a method for preparing a microporous molecular sieve material comprising first preparing a reactive mixture containing reactive sources of components wherein the reactive mixture is described in terms of molar ratios of oxides by a formula $aR_2O\ bMO\ E_2O_3\ cP_2O_5\ dSiO_2\ eH_2O$ where "a" has a value of about 0.75 to about 12, "b" has a value of about 0 to about 2, "c" has a value of about 0.5 to about 8, "d" has a value of about 0 to about 4, and "e" has a value from 30 to 1000; then reacting the reaction mixture at a temperature of about 60° C. to about 200° C. for a period of about 1 day to about 21 days; followed by isolating a solid product from a heterogeneous mixture wherein the solid product has the x-ray diffraction pattern having at least the d-spacings and intensities set forth in Table 2.

TABLE 2

| 2-Theta | d(Å) | Intensity |
|---|---|---|
| 8.55-8.87 | 10.33-9.96 | w |
| 10.76-10.89 | 8.21-8.11 | s-vs |
| 11.16-11.35 | 7.92-7.79 | w-m |
| 13.44-13.58 | 6.58-6.51 | m |
| 15.97-16.13 | 5.54-5.49 | w |
| 16.85-17.11 | 5.26-5.18 | m-s |
| 17.26-17.43 | 5.13-5.08 | vs |
| 17.54-17.72 | 5.05-5.00 | m-s |
| 20.28-20.50 | 4.37-4.32 | s |
| 20.96-21.10 | 4.23-4.21 | m |
| 21.63-21.82 | 4.10-4.07 | m-s |
| 21.95-22.13 | 4.04-4.01 | vs |
| 22.55-22.84 | 3.94-3.89 | w-m |
| 23.41-23.59 | 3.80-3.77 | m-s |
| 24.44-24.66 | 3.64-3.61 | m |
| 25.56-25.78 | 3.48-3.45 | vw-w |
| 27.10-27.35 | 3.29-3.27 | m-s |
| 27.47-27.86 | 3.24-3.20 | s-vs |
| 28.00-28.28 | 3.18-3.15 | m-s |
| 29.22-29.45 | 3.05-3.03 | w |
| 30.72-31.00 | 2.91-2.88 | m |
| 32.27-32.57 | 2.77-2.75 | m-s |
| 33.68-34.04 | 2.66-2.63 | m-s |
| 34.11-34.47 | 2.63-2.60 | w-s |
| 36.79-37.13 | 2.44-2.42 | vw-w |

An embodiment of the invention is one, any or all of prior embodiments in this paragraph up through the first embodiment in this paragraph further comprising calcining the microporous crystalline material at a temperature of at least 500° C. to obtain a calcined AlPO-77 material that is characterized by the x-ray diffraction pattern, having at least the d-spacings and relative intensities set forth in Table 1 below.

TABLE 1

| 2-Theta | d(Å) | Intensity |
|---|---|---|
| 8.73-9.35 | 10.12-9.48 | w-m |
| 11.06-11.55 | 7.99-7.65 | m-s |
| 13.60-13.84 | 6.50-6.39 | m-vs |
| 14.11-14.71 | 6.27-6.01 | w-s |
| 17.41-17.93 | 5.09-4.94 | s |
| 20.89-21.57 | 4.25-4.11 | m-s |
| 22.27-22.67 | 3.99-3.92 | s |
| 24.55-24.82 | 3.62-3.58 | w-m |
| 25.22-25.53 | 3.53-3.48 | w-m |
| 26.63-27.40 | 3.34-3.25 | w-m |
| 28.45-28.83 | 3.13-3.09 | s |

TABLE 1-continued

| 2-Theta | d(Å) | Intensity |
|---|---|---|
| 29.02-29.61 | 3.07-3.01 | m-s |
| 32.65-32.80 | 2.74-2.73 | w |
| 33.02-33.18 | 2.71-2.70 | w-m |
| 34.91-35.34 | 2.57-2.54 | m |

An embodiment of the invention is one, any or all prior embodiments in this paragraph up through the first embodiment in this paragraph further comprising calcining the microporous crystalline material at a temperature of at least 500° C. wherein the calcined material is allowed to fully re-hydrate and then dried in an ambient atmosphere. activated at a temperature from 150 to 400° C. in an environment ranging from ambient atmosphere to vacuum to obtain an AlPO-77 material that is characterized by the x-ray diffraction pattern, having at least the d-spacings and relative intensities set forth in Table 1 below.

TABLE 1

| 2-Theta | d(Å) | Intensity |
|---|---|---|
| 8.73-9.35 | 10.12-9.48 | w-m |
| 11.06-11.55 | 7.99-7.65 | m-s |
| 13.60-13.84 | 6.50-6.39 | m-vs |
| 14.11-14.71 | 6.27-6.01 | w-s |
| 17.41-17.93 | 5.09-4.94 | s |
| 20.89-21.57 | 4.25-4.11 | m-s |
| 22.27-22.67 | 3.99-3.92 | s |
| 24.55-24.82 | 3.62-3.58 | w-m |
| 25.22-25.53 | 3.53-3.48 | w-m |
| 26.63-27.40 | 3.34-3.25 | w-m |
| 28.45-28.83 | 3.13-3.09 | s |
| 29.02-29.61 | 3.07-3.01 | m-s |
| 32.65-32.80 | 2.74-2.73 | w |
| 33.02-33.18 | 2.71-2.70 | w-m |
| 34.91-35.34 | 2.57-2.54 | m |

An embodiment of the invention is one, any or all prior embodiments in this paragraph up through the first embodiment in this paragraph wherein E is aluminum and a source of aluminum is selected from the group consisting of aluminum alkoxides, precipitated aluminas, aluminum metal, aluminum hydroxide, aluminum salts and alumina sols. An embodiment of the invention is one, any or all prior embodiments in this paragraph up through the first embodiment in this paragraph wherein a source of silica is selected from the group consisting of tetraethylorthosilicate, colloidal silica, and precipitated silica. An embodiment of the invention is one, any or all prior embodiments in this paragraph up through the first embodiment in this paragraph wherein sources of other E elements are selected from the group consisting of organoammonium borates, boric acid, precipitated gallium oxyhydroxide, gallium sulfate, ferric sulfate, and ferric chloride. An embodiment of the invention is one, any or all prior embodiments in this paragraph up through the first embodiment in this paragraph wherein sources of M metals are selected from the group consisting of halide salts, nitrate salts, acetate salts, and sulfate salts of the respective alkaline earth and transition metals. An embodiment of the invention is one, any or all prior embodiments in this paragraph up through the first embodiment in this paragraph wherein R is an organoammonium cation prepared from the reaction of an aqueous mixture of a cyclic secondary amine and an organic dihalide. An embodiment of the invention is one, any or all prior embodiments in this paragraph up through the first embodiment in this paragraph wherein the cyclic secondary amine is selected from the group consisting of piperidine, homopiperidine, pyrrolidine, and morpholine. An embodiment of the invention is one, any or all of prior embodiments in this paragraph up through the first embodiment in this paragraph wherein the organic dihalide is selected from the group consisting of 1,4-dibromobutane, 1,5-dibromopentane, and 1,6-dibromohexane. An embodiment of the invention is one, any or all of prior embodiments in this paragraph up through the first embodiment in this paragraph wherein R is an acyclic organoammonium cation selected from the group consisting of ethyltrimethylammonium (ETMA$^+$), choline [Me$_3$NCH$_2$CH$_2$OH]$^+$, trimethylpropylammonium, diethyldimethylammonium (DEDMA$^+$), tetramethylammonium (TMA$^+$) tetraethylammonium (TEA$^+$), tetrapropylammonium (TPA$^+$) and mixtures thereof.

A third embodiment of the invention is a process for separating mixtures of molecular species or removing contaminants through ion exchange comprising contacting crystalline AlPO-77 materials with a feedstream comprising mixtures of molecular species or a feedstream containing contaminants where the AlPO-77 comprises a three-dimensional framework of at least EO$_{4/2}^-$ and PO$_{4/2}^+$ tetrahedral units, and furthermore, at least one of [M$^{2+}$O$_{4/2}$]$^{2-}$ and SiO$_{4/2}$ tetrahedral units and an empirical composition in the calcined form and anhydrous basis expressed by an empirical formula of H$_w$M$_m^{2+}$EP$_x$Si$_y$O$_z$ where H is a proton, "w" is the mole ratio of H to E and varies from 0 to 2.5, M is at least one metal cation of valence +2 selected from the group consisting of Be$^{2+}$, Mg$^{2+}$, Zn$^{2+}$, Co$^{2+}$, Mn$^{2+}$, Fe$^{2+}$, Ni$^{2+}$, "m" is the mole ratio of M to E and varies from 0 to about 1.0, E is a trivalent element selected from the group consisting of aluminum, gallium, iron, boron and mixtures thereof, "x" is mole ratio of P to E and varies from 0.5 to about 2.0, "y" is the mole ratio of Si to E and varies from 0 to about 2.0 and "z" is the mole ratio of O to E and has a value determined by the equation z=(w+2·m+3+5·x+4·y)/2 and wherein the calcined material has a x-ray diffraction pattern having at least the d-spacings and intensities set forth in Table 1.

TABLE 1

| 2-Theta | d(Å) | Intensity |
|---|---|---|
| 8.73-9.35 | 10.12-9.48 | w-m |
| 11.06-11.55 | 7.99-7.65 | m-s |
| 13.60-13.84 | 6.50-6.39 | m-vs |
| 14.11-14.71 | 6.27-6.01 | w-s |
| 17.41-17.93 | 5.09-4.94 | s |
| 20.89-21.57 | 4.25-4.11 | m-s |
| 22.27-22.67 | 3.99-3.92 | s |
| 24.55-24.82 | 3.62-3.58 | w-m |
| 25.22-25.53 | 3.53-3.48 | w-m |
| 26.63-27.40 | 3.34-3.25 | w-m |
| 28.45-28.83 | 3.13-3.09 | s |
| 29.02-29.61 | 3.07-3.01 | m-s |
| 32.65-32.80 | 2.74-2.73 | w |
| 33.02-33.18 | 2.71-2.70 | w-m |
| 34.91-35.34 | 2.57-2.54 | m |

A fourth embodiment of the invention is a process of catalyzing a hydrocarbon conversion process comprising contacting a hydrocarbon feedstream with crystalline AlPO-77 materials comprising a three-dimensional framework of at least EO$_{4/2}^-$ and PO$_{4/2}^+$ tetrahedral units, and furthermore, at least one of [M$^{2+}$O$_{4/2}$]$^{2-}$ and SiO$_{4/2}$ tetrahedral units and an empirical composition in the calcined form and anhydrous basis expressed by an empirical formula of H$_w$Mm$^{2+}$EP$_x$Si$_y$O$_z$ where H is a proton, "w" is the mole ratio of H to E and varies from 0 to 2.5, M is at least one metal cation of valence +2 selected from the group consisting of Be$^{2+}$, $Mg^{2+}$, $Zn^{2+}$, $Co^{2+}$, $Mn^{2+}$, $Fe^{2+}$, $Ni^{2+}$, "m" is the mole ratio of M to E and varies from 0 to about 1.0, E is a trivalent element selected from the group consisting of aluminum, gallium, iron, boron and mixtures thereof, "x" is mole ratio of P to E and varies from 0.5 to about 2.0, "y" is the mole ratio of Si to E and varies from 0 to about 2.0 and "z" is the mole ratio of O to E and has a value determined by the equation $z=(w+2\cdot m+3+5\cdot x+4\cdot y)/2$ and wherein the calcined material has a x-ray diffraction pattern having at least the d-spacings and intensities set forth in Table 1.

TABLE 1

| 2-Theta | d(Å) | Intensity |
|---|---|---|
| 8.73-9.35 | 10.12-9.48 | w-m |
| 11.06-11.55 | 7.99-7.65 | m-s |
| 13.60-13.84 | 6.50-6.39 | m-vs |
| 14.11-14.71 | 6.27-6.01 | w-s |
| 17.41-17.93 | 5.09-4.94 | s |
| 20.89-21.57 | 4.25-4.11 | m-s |
| 22.27-22.67 | 3.99-3.92 | s |
| 24.55-24.82 | 3.62-3.58 | w-m |
| 25.22-25.53 | 3.53-3.48 | w-m |
| 26.63-27.40 | 3.34-3.25 | w-m |
| 28.45-28.83 | 3.13-3.09 | s |
| 29.02-29.61 | 3.07-3.01 | m-s |
| 32.65-32.80 | 2.74-2.73 | w |
| 33.02-33.18 | 2.71-2.70 | w-m |
| 34.91-35.34 | 2.57-2.54 | m |

An embodiment of the invention is one, any or all of prior embodiments in this paragraph up through the third embodiment in this paragraph wherein the hydrocarbon conversion processes are selected from the group consisting of cracking, hydrocracking, alkylation of both aromatics and isoparaffin, isomerization, polymerization, reforming, hydrogenation, dehydrogenation, transalkylation, dealkylation, hydration, dehydration, hydrotreating, hydrodenitrogenation, hydrodesulfurization, methanol to olefins, methanation and syngas shift process.

A fifth embodiment of the invention is a process for adsorbing water vapor comprising contacting the water vapor with crystalline AlPO-77 materials comprising a three-dimensional framework of at least $EO_{4/2}^-$ and $PO_{4/2}^+$ tetrahedral units, and furthermore, at least one of $[M^{2+}O_{4/2}]^{2-}$ and $SiO_{4/2}$ tetrahedral units and an empirical composition in the calcined form and anhydrous basis expressed by an empirical formula of $H_wM_m^{2+}EP_xSi_yO_z$ where H is a proton, "w" is the mole ratio of H to E and varies from 0 to 2.5, M is at least one metal cation of valence +2 selected from the group consisting of $Be^{2+}$, $Mg^{2+}$, $Zn^{2+}$, $Co^{2+}$, $Mn^{2+}$, $Fe^{2+}$, $Ni^{2+}$, "m" is the mole ratio of M to E and varies from 0 to about 1.0, E is a trivalent element selected from the group consisting of aluminum, gallium, iron, boron and mixtures thereof, "x" is mole ratio of P to E and varies from 0.5 to about 2.0, "y" is the mole ratio of Si to E and varies from 0 to about 2.0 and "z" is the mole ratio of O to E and has a value determined by the equation $z=(w+2\cdot m+3+5\cdot x+4\cdot y)/2$ and wherein the calcined material has a x-ray diffraction pattern having at least the d-spacings and intensities set forth in Table 1.

TABLE 1

| 2-Theta | d(Å) | Intensity |
|---|---|---|
| 8.73-9.35 | 10.12-9.48 | w-m |
| 11.06-11.55 | 7.99-7.65 | m-s |
| 13.60-13.84 | 6.50-6.39 | m-vs |

TABLE 1-continued

| 2-Theta | d(Å) | Intensity |
|---|---|---|
| 14.11-14.71 | 6.27-6.01 | w-s |
| 17.41-17.93 | 5.09-4.94 | s |
| 20.89-21.57 | 4.25-4.11 | m-s |
| 22.27-22.67 | 3.99-3.92 | s |
| 24.55-24.82 | 3.62-3.58 | w-m |
| 25.22-25.53 | 3.53-3.48 | w-m |
| 26.63-27.40 | 3.34-3.25 | w-m |
| 28.45-28.83 | 3.13-3.09 | s |
| 29.02-29.61 | 3.07-3.01 | m-s |
| 32.65-32.80 | 2.74-2.73 | w |
| 33.02-33.18 | 2.71-2.70 | w-m |
| 34.91-35.34 | 2.57-2.54 | m |

An embodiment of the invention is one, any or all prior embodiments in this paragraph up through the embodiment in this paragraph wherein the adsorption of water vapor is during the operation of an adsorption heat pump apparatus.

The invention claimed is:

1. A microporous crystalline material comprising a three-dimensional framework of at least $EO_{4/2}^-$ and $PO_{4/2}^+$ tetrahedral units and optionally, at least one of $[M^{2+}O_{4/2}]^{2-}$ and $SiO_{4/2}$ tetrahedral units and an empirical composition in the as-synthesized form and anhydrous basis expressed by an empirical formula of:

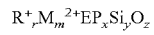

where M is at least one metal cation of valence +2 selected from the group consisting of $Be^{2+}$, $Mg^{2+}$, $Zn^{2+}$, $Co^{2+}$, $Mn^{2+}$, $Fe^{2+}$, $N^{2+}$, "m" is the mole ratio of M to E and varies from 0 to about 1.0, and R is an organoammonium cation, "r" is the mole ratio of R to E and has a value of about 0.1 to about 2.5, E is a trivalent element selected from the group consisting of aluminum, gallium, iron, boron and mixtures thereof, "x" is mole ratio of P to E and varies from 0.5 to about 2.0, "y" is the mole ratio of Si to E and varies from 0 to about 2.0, and "z" is the mole ratio of O to E and has a value determined by the equation:

$$z=(2\cdot m+r+3+5\cdot x+4\cdot y)/2$$

wherein said material is characterized in that it has the x-ray diffraction pattern having at least the d-spacings and intensities set forth in Table 2:

TABLE 2

| 2-Theta | d(Å) | Intensity |
|---|---|---|
| 8.55-8.87 | 10.33-9.96 | w |
| 10.76-10.89 | 8.21-8.11 | s-vs |
| 11.16-11.35 | 7.92-7.79 | w-m |
| 13.44-13.58 | 6.58-6.51 | m |
| 15.97-16.13 | 5.54-5.49 | w |
| 16.85-17.11 | 5.26-5.18 | m-s |
| 17.26-17.43 | 5.13-5.08 | vs |
| 17.54-17.72 | 5.05-5.00 | m-s |
| 20.28-20.50 | 4.37-4.32 | s |
| 20.96-21.10 | 4.23-4.21 | m |
| 21.63-21.82 | 4.10-4.07 | s |
| 21.95-22.13 | 4.04-4.01 | vs |
| 22.55-22.80 | 3.94-3.90 | m |
| 23.41-23.59 | 3.80-3.77 | m-s |
| 24.44-24.66 | 3.64-3.61 | m |
| 25.56-25.78 | 3.48-3.45 | vw-w |
| 27.10-27.35 | 3.29-3.27 | m-s |
| 27.47-27.79 | 3.24-3.21 | s-vs |
| 28.00-28.28 | 3.18-3.15 | m-s |
| 29.22-29.45 | 3.05-3.03 | w |
| 30.72-31.00 | 2.91-2.88 | m |

TABLE 2-continued

| 2-Theta | d(Å) | Intensity |
|---|---|---|
| 32.27-32.57 | 2.77-2.75 | m-s |
| 33.68-34.04 | 2.66-2.63 | m-s |
| 34.11-34.37 | 2.63-2.61 | m-s |
| 36.79-37.13 | 2.44-2.42 | vw-w, | and wherein after being calcined or calcined and activated, said material comprises a three-dimensional framework of at least $EO_{4/2}^-$ and $PO_{4/2}^+$ tetrahedral units, and furthermore, at least one of $[M^{2+}O_{4/2}]^{2-}$ and $SiO_{4/2}$ tetrahedral units and an empirical composition on an anhydrous basis expressed by an empirical formula of:

$$H_w M_m^{2+} E P_x Si_y O_z$$

where H is a proton, "w" is the mole ratio of H to E and varies from 0 to 2.5, M is at least one metal cation of valence +2 selected from the group consisting of $Be^{2+}$, $Mg^{2+}$, $Zn^{2+}$, $Co^{2+}$, $Mn^{2+}$, $Fe^{2+}$, $Ni^{2+}$, "m" is the mole ratio of M to E and varies from 0 to about 1.0, E is a trivalent element selected from the group consisting of aluminum, gallium, iron, boron and mixtures thereof, "x" is mole ratio of P to E and varies from 0.5 to about 2.0, "y" is the mole ratio of Si to E and varies from 0 to about 2.0 and "z" is the mole ratio of O to E and has a value determined by the equation:

$$z=(w+2 \cdot m+3+5 \cdot x+4 \cdot y)/2$$

and wherein said material has a x-ray diffraction pattern having at least the d-spacings and intensities set forth in Table 1:

TABLE 1

| 2-Theta | d(Å) | Intensity |
|---|---|---|
| 8.73-9.35 | 10.12-9.48 | w-m |
| 11.06-11.55 | 7.99-7.65 | m-s |
| 13.60-13.84 | 6.50-6.39 | m-vs |
| 14.11-14.71 | 6.27-6.01 | w-s |
| 17.41-17.93 | 5.09-4.94 | s |
| 20.89-21.57 | 4.25-4.11 | m-s |
| 22.27-22.67 | 3.99-3.92 | s |
| 24.55-24.82 | 3.62-3.58 | w-m |
| 25.22-25.53 | 3.53-3.48 | w-m |
| 26.63-27.40 | 3.34-3.25 | w-m |
| 28.45-28.83 | 3.13-3.09 | s |
| 29.02-29.61 | 3.07-3.01 | m-s |
| 32.65-32.80 | 2.74-2.73 | w |
| 33.02-33.18 | 2.71-2.70 | w-m |
| 34.91-35.34 | 2.57-2.54 | m. |

2. The calcined microporous material of claim 1 that indexes on a unit cell with hexagonal axes with lattice parameters a=12.41 Å and c=23.2 Å.

3. The calcined microporous material of claim 2 comprising an ABC-6 net structure with a stacking sequence repeating every 9 layers along the c-axis (p=23.2/2.6=8.92).

* * * * *